(12) United States Patent
Yoda et al.

(10) Patent No.: US 11,826,933 B2
(45) Date of Patent: Nov. 28, 2023

(54) FOAM MOLDING METHOD AND INJECTION MOLDING MACHINE

(71) Applicant: NISSEI PLASTIC INDUSTRY CO., LTD., Nagano (JP)

(72) Inventors: Hozumi Yoda, Nagano (JP); Hirofumi Murata, Nagano (JP); Shinichi Kasuga, Nagano (JP)

(73) Assignee: NISSEI PLASTIC INDUSTRY CO., LTD., Nagano (JP)

( * ) Notice: Subject to any disclaimer, the term of this patent is extended or adjusted under 35 U.S.C. 154(b) by 0 days.

(21) Appl. No.: 18/099,724

(22) Filed: Jan. 20, 2023

(65) Prior Publication Data

US 2023/0158720 A1 May 25, 2023

Related U.S. Application Data

(62) Division of application No. 16/921,293, filed on Jul. 6, 2020, now Pat. No. 11,584,050.

(30) Foreign Application Priority Data

Jul. 5, 2019 (JP) ................................. 2019-125817

(51) Int. Cl.
*B29C 44/42* (2006.01)
*B29C 44/34* (2006.01)
(Continued)

(52) U.S. Cl.
CPC .......... *B29C 44/42* (2013.01); *B29C 44/3415* (2013.01); *B29C 44/60* (2013.01);
(Continued)

(58) Field of Classification Search
CPC ................... B29C 44/42; B29C 44/60; B29C 2945/76581
(Continued)

(56) References Cited

U.S. PATENT DOCUMENTS 3,773,451 A * 11/1973 Bielfeldt ................. B29C 45/76
264/328.13
2002/0145214 A1* 10/2002 Murakoshi .......... B29C 44/0415
264/45.5
(Continued)

FOREIGN PATENT DOCUMENTS

DE 39 17 361 A1 9/1990
EP 1 250 994 A1 10/2002
(Continued)

OTHER PUBLICATIONS

Extended European Search Report dated Dec. 2, 2020 in European Application No. 20184086.5.

*Primary Examiner* — Matthew J Daniels
*Assistant Examiner* — Gregory C. Grosso
(74) *Attorney, Agent, or Firm* — Sughrue Mion, PLLC

(57) ABSTRACT

To provide a new foam molding method and injection molding machine capable of solving variation in a wall thickness and a foamed state, sensor corrosion, a complexity of sensor positioning, and the like. The above-described problem is solved by a foam molding method comprising a resin filling step of filling a mold (2), clamped by a predetermined mold clamping force (Pc), with a resin (R) at a predetermined molding injection pressure (Pi), a filling stopping step of stopping the filling of the resin (R) when, while monitoring a mold gap (Lm) of the mold (2) during the filling, a predetermined mold gap value set in advance is reached, a surface layer curing and filled resin cooling step of curing a surface layer of the resin (R) for a certain time and cooling the filled resin (R) for a certain time after the filling of the resin (R) is stopped, a volume controlling step of controlling a volume increase by reducing the mold clamping force after curing the surface layer of the resin (R) for a certain time, and a taking out step of taking out a (Continued)

foam-molded product by opening the mold (2) after the volume control is performed and after cooling the filled resin (R) for a certain time.

4 Claims, 8 Drawing Sheets

(51) Int. Cl.
*B29C 44/60* (2006.01)
*B29C 45/76* (2006.01)
*B29C 45/77* (2006.01)
*B29C 45/80* (2006.01)
*B29K 105/04* (2006.01)

(52) U.S. Cl.
CPC .......... *B29C 45/7653* (2013.01); *B29C 45/77* (2013.01); *B29C 45/80* (2013.01); *B29C 2945/76498* (2013.01); *B29C 2945/76561* (2013.01); *B29C 2945/76581* (2013.01); *B29C 2945/76869* (2013.01); *B29K 2105/04* (2013.01)

(58) Field of Classification Search
USPC ........................................................ 264/45.1
See application file for complete search history.

(56) References Cited

U.S. PATENT DOCUMENTS

| | | |
|---|---|---|
| 2002/0195735 A1 | 12/2002 | Mizouchi et al. |
| 2010/0308500 A1 | 12/2010 | Okamoto et al. |
| 2012/0146260 A1 | 6/2012 | Murata et al. |
| 2017/0312953 A1 | 11/2017 | Romanov et al. |

FOREIGN PATENT DOCUMENTS

| | | |
|---|---|---|
| EP | 1 717 655 A1 | 11/2006 |
| EP | 2 343 333 A1 | 7/2011 |
| JP | 6-22835 B2 | 3/1994 |
| JP | 2002-1751 A | 1/2002 |
| JP | 2004-98582 A | 4/2004 |
| WO | 2011/161899 A1 | 12/2011 |

* cited by examiner

Before injection filling

During just-packing

FOAM MOLDING METHOD AND INJECTION MOLDING MACHINE

CROSS REFERENCE TO RELATED APPLICATION

This Application is a Divisional of U.S. patent application Ser. No. 16/921,293, filed Jul. 6, 2020, which is based on, and claims priority from the prior Japanese Patent Application No. 2019-125817, filed on Jul. 5, 2019, the entire contents of which are incorporated herein by reference.

FIELD OF THE INVENTION

The present invention relates to a foam molding method and an injection molding machine, and more specifically to a foam molding method and an injection molding machine that utilize an injection pressure for performing a just-packing control inside a molding mold and a mold clamping force at which an opening of a mold parting line appears when injection molding is performed at the injection pressure, and information from a gap sensor of the mold parting line.

BACKGROUND ART

Weight saving of automobile parts in demand and, particularly for large parts, foam-molded products that can realize weight saving are in demand. For example, by saving the weight of a door trim (door lining) of an automobile as a foam-molded product, it is possible to enhance an energy-saving effect. Further, by using the interior of a part as a foam-molded product, a soundproof effect is also improved and, at locations where the part was assembled as a set with conventional soundproofing materials, it is possible to reduce the number of parts and enhance an economic effect as well. There have been proposed several prior arts to meet such demands.

Patent Document 1 proposes a technique for performing a core-back molding while controlling an expansion rate of a foamed resin so that a mold internal pressure does not become negative on the basis of a mold internal pressure sensor. Specifically, Patent Document 1 proposes an injection foam molding machine and an injection foam molding method capable of making a plate thickness of a foam-molded product uniform by moving a movable mold plate in parallel when the mold is slightly opened (core-back operation) by the injection foam molding machine. This technique is a technique that controls the opening speed so that the mold internal pressure detected by the mold internal pressure sensor does not become negative when a molten resin is injected and filled into a mold cavity and the mold is slightly opened to cause foaming, and uses a plurality of ball screw type jacks to slightly open the mold during foaming to synchronously control a servo motor that drives the jacks.

Patent Document 2 proposes a technique for controlling the dimensions of a foam body by a mold internal pressure sensor. Specifically, Patent Document 2 proposes a manufacturing method whereby dimension control is easy and a foam body having desired dimensions can be stably obtained, and a manufacturing device whereby dimension control can be easily performed and a foam body having desired dimensions can be more stably obtained. In this technique, given P2 as a pressure at the moment that a shrinkable molding material not containing a foaming agent is injected into a mold and a pressure inside the mold begins to decrease and $\Delta P2$ as a decrease amount of the pressure inside the mold from P2 and, on the other hand, P3 as a minimum pressure from the moment that a shrinkable molding material containing a foaming agent is completely injected into the mold until the pressure inside the mold begins to increase, and $\Delta P3$ as an increase amount of the pressure inside the mold from P3, a sum $\Delta P4$ of $\Delta P2$ and $\Delta P3$ is controlled on the basis of a correlation between a dimensional change of the foam body obtained in advance and $\Delta P4$ and the dimensions of the obtained foam body are adjusted to obtain a foam body having desired dimensions.

Patent Document 3 proposes a technique for detecting a foamed state with a pressure sensor and clamping a mold accordingly. Specifically, the technique is an injection compression molding method that solves the problem that, when a porous molded product containing a large number of foamy gases is molded using a foamable resin, it is difficult to determine the timing of mold clamping after resin injection, and is a technique for injecting a foamable molten resin into a cavity of a mold before mold closing is complete, detecting a foamed state thereof, and clamping the mold, thereby compressing the foamable molten resin to mold a molded product, or injecting a foamable molten resin into a cavity of a mold before mold closing is complete and, after a preset time has elapsed, clamping the mold, thereby compressing the foamable molten resin to mold a molded product.

PRIOR ART DOCUMENTS

Patent Documents

Patent Document 1: Japanese Laid-Open Patent Application No. 2004-98582
Patent Document 2: Japanese Laid-Open Patent Application No. 2002-1751
Patent Document 3: Japanese Examined Patent Publication No. H06-22835
Patent Document 4: WO 2011/161899A1

SUMMARY OF THE INVENTION

Problems to be Solved by the Invention

A so-called core-back foam molding technique has been adopted as a method for manufacturing a foam-molded product. This method is a method for using a mold with a variable cavity capacity, keeping the capacity of the cavity small when filling the mold with the foamable molten resin, and expanding the capacity of the cavity after the mold is filled to cause foaming. However, in the conventional core-back foam molding technique, the foamed state of the molded product may become uneven, and a wall thickness of the molded product is likely to vary. Further, because an injection filling amount is managed by a stroke of a screw, the timing of closing a resin backflow preventing valve at a screw tip end may not always be constantly controlled, and thus the filling amount is not fixed and variance occurs in the foamed state.

Further, as a technique for solving the variation in the wall thickness and the foamed state of the foam-molded product, the above-described Patent Documents 1 to 3 propose a technique for monitoring the mold internal pressure by a mold internal pressure sensor. However, the mold internal pressure sensor is problematic in that the sensor is corroded by gas generated during resin filling and, because the pressure distribution is biased due to the shape and size of the product, it is difficult to position the sensor and necessary to examine the sensor position when designing the mold.

The present invention is made to solve the above-described problems, and an object of the present invention is to provide a new foam molding method and injection molding machine capable of solving variation in a wall thickness and a foamed state and solving a problem of sensor corrosion, a problem of sensor positioning, and the like without use of a mold internal pressure sensor as well.

Means for Solving the Problems

The present inventors found that the above-described problems can be solved by utilizing an injection pressure (also referred to as molding injection pressure) for performing a just-packing control inside a molding mold and a mold clamping force (also referred to as a molding mold clamping force) at which an opening of a mold parting line (also referred to as P/L surface) appears when injection molding is performed at the molding injection pressure, further utilizing a gap sensor for monitoring a parting opening amount of the mold, and utilizing information from the gap sensor, and accomplished the present invention.

(1) A foam molding method according to the present invention is a foam molding method for performing molding by filling a mold composed of a fixed mold and a movable mold, clamped by a predetermined mold clamping force (molding mold clamping force), with a resin containing a foaming agent at a predetermined injection pressure (molding injection pressure), and the foam molding method comprises:
  a resin filling step of filling the mold, clamped by the predetermined mold clamping force, with the resin at the predetermined injection pressure,
  a filling stopping step of stopping the filling when, while monitoring a mold gap of the mold during the filling, a predetermined mold gap value set in advance is reached,
  a surface layer curing and filled resin cooling step of curing a surface layer of the resin for a certain time, and cooling the filled resin for a certain time after the filling is stopped,
  a volume controlling step of controlling a volume increase by reducing the mold clamping force after curing the surface layer of the resin for a certain time, and
  a taking out step of taking out a foam-molded product by opening the mold after the volume controlling step is performed and after of cooling the filled resin for a certain time.

According to this invention, (a) the mold clamped by a predetermined mold clamping force (molding mold clamping force) is filled at a predetermined injection pressure (molding injection pressure) for performing a just-packing control inside the mold with the resin, making it possible to control the filling amount of the resin by the injection pressure and realize stable resin filling. Further, it is not necessary to manage the injection filling amount by a stroke of a screw, making it possible to make the resin amount filled in the mold constant without being influenced by injection position control or the operation of the backflow preventing valve. (b) The filling of the resin into the mold clamped by the predetermined mold clamping force (molding mold clamping force) stops when the mold gap of the mold reaches the predetermined mold gap value, making it possible to adopt, as the sensor used for the stop operation, a gap sensor provided outside the cavity instead of a mold internal pressure sensor provided inside the cavity such as in the related art. (c) The mold gap can be monitored by the mold gap sensor, and the mold gap sensor can be attached as desired to a mold outer surface not affected by the generated gas. In a case where the shape and the size of the product differ, distortion and deviation may occur in the molding mold. However, even in that case, it is possible to provide the mold gap sensor to the mold outer surface not affected by the molded product ultimately obtained, and thus perform accurate measurement by the mold gap sensor even when distortion and deviation occur. It should be noted that the timing of stopping the resin filling can be displayed on the surveillance monitor for monitoring the measured mold gap data, and the stop timing can be input by using the surveillance monitor as a monitoring position setting device. (d) After the filling is stopped, the cooling starts to cure the surface layer and cool the filled resin. However, the mold clamping force is reduced after curing the surface layer for a certain time to control the volume increase, and thus a foam-molded product including a cured surface layer can be obtained. (e) After the volume controlling step is performed and after cooling the filled resin for a certain time, the mold is opened and a foam-molded product is taken out, and thus a foam-molded product in a homogeneous foamed state can be obtained.

In the foam molding method according to the present invention, one or two or more data selected from the mold clamping force, the injection pressure, the mold gap, the mold gap value, a curing time of the surface layer, a cooling time of the filled resin, and the mold clamping force or the mold gap value or a mold gap enlargement speed for the volume increase are displayed or displayed and set on a display panel. In this way, it is easier to display the data or to display and set the data on the display panel, and a workability and a manageability can be improved.

In the foam molding method according to the present invention, a starting point of calculation for starting a surface layer curing time and a resin cooling time in the surface layer curing and filled resin cooling step is set to, when data of the mold gap and elapsed time are graphed, the moment that the mold gap reaches the predetermined mold gap value. In this way, it is possible to control the starting point of calculation for starting the surface layer curing, and start the volume control when the surface layer curing time set in advance is reached. As a result, it is possible to obtain a foam-molded product in which the surface layer is appropriately cured. Further, it is possible to control the starting point of calculation for starting the resin cooling by monitoring the mold gap, and take out the molded product when the cooling time set in advance elapses. As a result, it is possible to obtain a foam-molded product in a homogeneous foamed state.

In the foam molding method according to the present invention, control of the volume increase in the volume controlling step is performed by using one or two or more forces selected from the predetermined mold clamping force applied to the mold, a mold opening force by an internal pressure based on foaming of the resin, a mold opening force by a spring provided to the mold, and a mechanical mold opening force by a mold clamping cylinder, and reducing the mold clamping force to enlarge the mold gap to a predetermined value. In this way, the volume increase can be controlled while monitoring the enlargement of the mold gap to the predetermined mold gap value. The enlargement of the mold gap can be set by monitoring the mold gap data with the mold gap sensor.

The foam molding method according to the present invention further comprises a condition setting step of setting in advance one or two or more data selected from the mold clamping force, the injection pressure, the mold gap, the mold gap value, a curing time of the surface layer, a cooling time of the filled resin, and the mold clamping force or the mold gap value or a mold gap enlargement speed for the volume increase, and setting a predetermined value from the set data. In this way, a predetermined value is set from data set in advance, and thus by applying the set value in each step at the time of manufacture, it is possible to manufacture a stable foam-molded product.

(2) An injection molding machine according to the present invention comprises:
- a mold clamping device provided with a mold composed of a fixed mold and a movable mold clamped by a predetermined mold clamping force (molding mold clamping force),
- an injection device that fills the mold provided to the mold clamping device with a resin containing a foaming agent at a predetermined injection pressure (molding injection pressure), and
- a control device that controls an operation of the mold clamping device and the injection device.

The control device performs resin filling control of filling the mold clamped by the predetermined mold clamping force with the resin at the predetermined injection pressure by the injection device, filling stopping control of stopping the filling when, while monitoring a mold gap of the mold during the filling, a predetermined mold gap value set in advance is reached, surface layer curing and filled resin cooling control of curing a surface layer of the resin for a certain time and cooling the filled resin for a certain time after the filling is stopped, volume control of controlling a volume increase by reducing the mold clamping force after curing the surface layer of the resin for a certain time, and taking out control of taking out a foam-molded product by opening the mold after the volume control is performed and after cooling the filled resin for a certain time.

The injection molding machine according to the present invention further comprises a display panel that displays or displays and sets one or two or more data selected from the mold clamping force, the injection pressure, the mold gap, the mold gap value, a curing time of the surface layer, a cooling time of the filled resin, and the mold clamping force or the mold gap value or a mold gap enlargement speed for the volume increase.

In the injection molding machine according to the present invention, the control device sets a starting point of calculation for starting a surface layer curing time and a resin cooling time in the surface layer curing and filled resin cooling control to, when data of the mold gap and elapsed time are graphed, the moment that the mold gap reaches the predetermined mold gap value.

In the injection molding machine according to the present invention, the control device controls the volume increase in the volume control by using one or two or more forces selected from the predetermined mold clamping force applied to the mold, a mold opening force by an internal pressure based on foaming of the resin, a mold opening force by a spring provided to the mold, and a mechanical mold opening force by a mold clamping cylinder, and reducing the mold clamping force to enlarge the mold gap to a predetermined value.

Effect of the Invention

According to the present invention, it is possible to provide a new foam molding method and injection molding machine capable of solving variation in a wall thickness and a foamed state of a product, and the like, and solving a problem of sensor corrosion and a problem of sensor positioning without use of a mold internal pressure sensor as well.

EMBODIMENTS OF THE INVENTION

Figure 1:
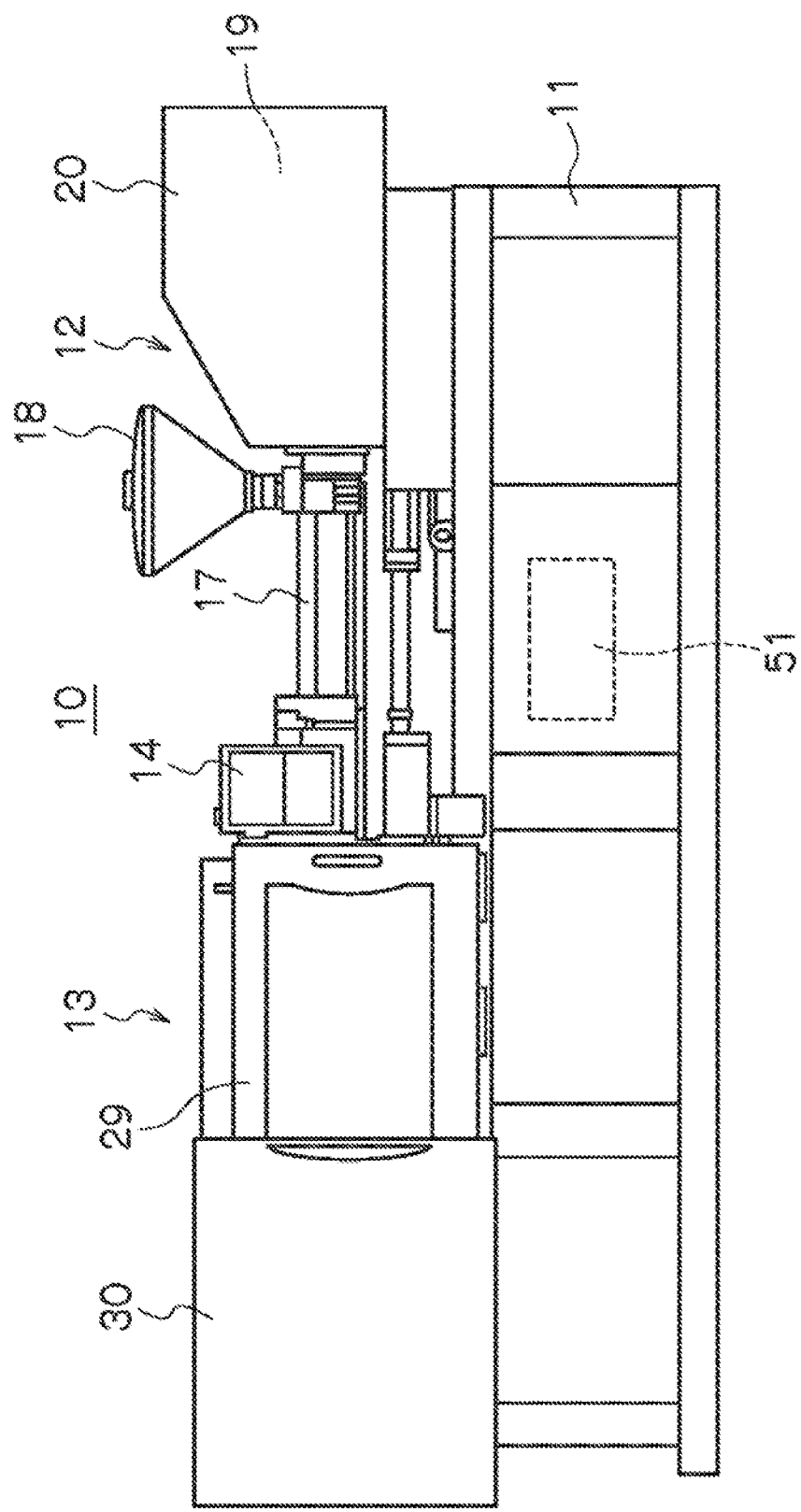
FIG. 1 is an external configuration view illustrating an example of an injection molding machine.

The following describes a foam molding method and an injection molding machine according to the present invention with reference to the drawings. It should be noted that the present invention is not limited to the following embodiments and various modifications and applications within the scope of the gist are also included.

A foam molding method according to the present invention is a foam molding method for performing molding by filling a mold 2 composed of a fixed mold 2c and a movable mold 2m clamped by a predetermined mold clamping force (molding mold clamping force Pc; hereinafter the same) with a resin R containing a foaming agent at a predetermined injection pressure (molding injection pressure Pi; hereinafter the same). Then, the present invention is characterized by including a resin filling step of filling the mold 2, clamped by the molding mold clamping force Pc (predetermined mold clamping force) with the resin R by the molding injection pressure Pi (predetermined injection pressure), a filling stopping step of stopping the filling of the resin R when, while monitoring a mold gap Lm of the mold 2 during the filling, a predetermined mold gap value set in advance is reached, a surface layer curing and filled resin cooling step of curing a surface layer of the resin R for a certain time and cooling the filled resin R for a certain time after the filling of the resin R is stopped, a volume controlling step of controlling a volume increase by reducing the mold clamping force after curing the surface layer of the resin R for a certain time, and a taking out step of taking out a foam-molded product by opening the mold 2 after the volume controlling step is performed and after cooling the filled resin R for a certain time. Further, an injection molding machine 10 according to the present invention is characterized by including a mold clamping device 13, an injection device 12, and a control device 51 for implementing this foam molding method.

The present inventors found that the conventional problems can be solved by utilizing the molding injection pressure Pi for performing a just-packing control inside the mold 2 and the molding mold clamping force Pc at which an opening of a mold parting line (also referred to as P/L surface) appears when injection molding is performed at the molding injection pressure Pi, further utilizing a gap sensor 9 for monitoring a parting opening amount of the mold 2, and utilizing information from the gap sensor 9, and accomplished this foam molding method.

That is, in this foam molding method, (a) the mold 2 clamped by the molding mold clamping force Pc (predetermined mold clamping force) is filled at the molding injection pressure Pi (predetermined injection pressure) for performing a just-packing control inside the mold with the resin R, making it possible to control a filling amount of the resin R by the injection pressure and realize stable resin filling. Further, it is not necessary to manage the injection filling amount by a stroke of a screw 16, making it possible to make the resin amount filled in the mold 2 constant without being influenced by injection position control or the operation of the backflow preventing valve. (b) The filling of the resin into the mold 2 clamped by the molding mold clamping force Pc stops when the mold gap Lm of the mold 2 reaches a predetermined mold gap value, making it possible to adopt, as the sensor used for the stop operation, the gap sensor 9 provided outside the cavity instead of a mold internal pressure sensor provided inside the cavity such as in the related art. (c) The mold gap Lm can be monitored by the mold gap sensor 9, and the mold gap sensor 9 can be attached as desired to a mold outer surface not affected by the generated gas. In a case where the shape and the size of the product differ, distortion and deviation may occur in the molding mold. However, even in that case, it is possible to provide the mold gap sensor 9 to the mold outer surface not affected by the molded product ultimately obtained, and thus perform accurate measurement by the mold gap sensor 9 even when distortion and deviation occur. It should be noted that the timing of stopping the resin filling can be displayed on a surveillance monitor 8 for monitoring measured mold gap data, and the stop timing can be input by using the surveillance monitor 8 as a monitoring position setting device. (d) After the filling is stopped, the cooling starts to cure the surface layer and cool the filled resin R. However, the mold clamping force is reduced after curing the surface layer for a certain time to control the volume increase, and thus a foam-molded product including a cured surface layer can be obtained. (e) After the volume controlling step is performed and after cooling the filled resin R for a certain time, the mold 2 is opened and a foam-molded product is taken out, and thus a foam-molded product in a homogeneous foamed state can be obtained.

(Differences from Prior Art of Present Applicant)

The foam molding method according to the present invention is an invention that solves the problems specific to foam molding on the basis of prior art developed by the present applicant (refer to Patent Document 4). First, a general molding method will be described. In a general molding method, a high-pressure mold clamping force is applied to the mold 2 to clamp the mold, and subsequently injection molding is performed. In this case, a mold clamping condition (mold clamping force) is set as a fixed condition, and an injection condition (injection pressure) under that mold clamping force is set. However, with regard to the resin R filled into the mold 2, even in a case where the injection pressure is precisely set, when a temperature of the mold 2 or the mold clamping device 13 fluctuates, the quality and homogeneity of the molded product are affected. Further, the main conditions at the time of molding, including injection conditions such as injection speed, speed switching position, speed pressure switching position, injection pressure, and holding pressure, accurate resin measurement conditions, and the like are set by the injection device 12, and thus there is a limit in the control by the injection device 12 whereby accurate resin measurements and the like are difficult. Moreover, because a series of controls such as multistage control and holding pressure control for the injection speed are usually performed, a molding cycle time is long, and there is a limit to the shortening of the molding cycle time and mass productivity.

The prior art (refer to Patent Document 4) developed by the present applicant solves the problem in the conventional molding method described above, and is a method for performing molding by filling the mold 2 (fixed mold 2c and movable mold 2m) clamped by a predetermined mold clamping force (molding mold clamping force Pc) with the resin R at the predetermined injection pressure (molding injection pressure Pi). As the mold clamping device 13, a mold clamping device capable of compressing (naturally compressing) the resin as the resin R in the mold 2 solidifies is used. The molding injection pressure Pi and the molding mold clamping force Pc whereby, using this mold molding device 13, the predetermined mold gap Lm occurs between the movable mold 2m and the fixed mold 2c during injection filling and a quality product can be molded are found as conditions established in advance. On the basis of the conditions (molding injection pressure Pi and molding mold clamping force Pc) thus found, the mold is clamped by the molding mold clamping force Pc at the time of production, the resin R is injected by setting the molding injection pressure Pi to the limit pressure and, after the predetermined cooling time elapses, the molded product is taken out.

When an attempt is made to apply this technique to foam molding, the molding injection pressure Pi and the molding mold clamping force Pc are substantially the same as those in the prior art. Specifically, the molding injection pressure Pi for performing a just-packing control inside the mold 2 and the molding mold clamping force Pc at which the opening of the P/L surface appears when injection molding is performed at the molding injection pressure Pi are utilized. Thereby, it is possible to perform a just-packing control inside the mold 2 with the resin R containing a foaming agent, control the filling amount of the resin R by the injection pressure, and realize stable resin filling. On the other hand, in foam molding, volume control means called core back of expanding a capacity of the cavity after the mold is filled to cause foaming is adopted. However, the present invention is characterized in that, when core back specific to foam molding is performed upon utilizing the molding injection pressure Pi and the molding mold clamping force Pc, the core back is performed after the surface layer is cured for a certain time, using the time at which the predetermined mold gap value is reached as the starting point (starting point of calculation) of the surface layer curing. Furthermore, the present invention is characterized in that the volume increase is controlled by reducing the mold clamping force after curing the surface layer for a certain time. With adoption of such characteristic means, it is possible to cause a melted portion on a center side to foam with the surface of the resin R cured, and thus perform molding in a quality, homogeneous foamed state.

The following describes each component.

[Injection Molding Machine]

The injection molding machine 10 is a device that performs molding by filling the mold 2 clamped by the molding mold clamping force Pc with the resin R containing a foaming agent at the molding injection pressure Pi, and implements the foam molding method according to the present invention. In the example in FIG. 1, the mold clamping device 13, the injection device 12, and the control device 51 are provided on a machine base 11. A cover 20, a safety door 29, and a cover 30 are provided to a driving part of the injection device 12 and the mold clamping device 13. Although the example in FIG. 1 is a horizontal type of injection molding machine 10, the machine may be a vertical type of injection molding machine and is not particularly limited. Further, the drive system is also not limited, and may be an electric drive or a hydraulic drive. It should be noted that, although a display device 14 is usually attached to the injection molding machine 10, the device may be provided in a work place away from the injection molding machine 10.

(Mold Clamping Device)

Figure 6:
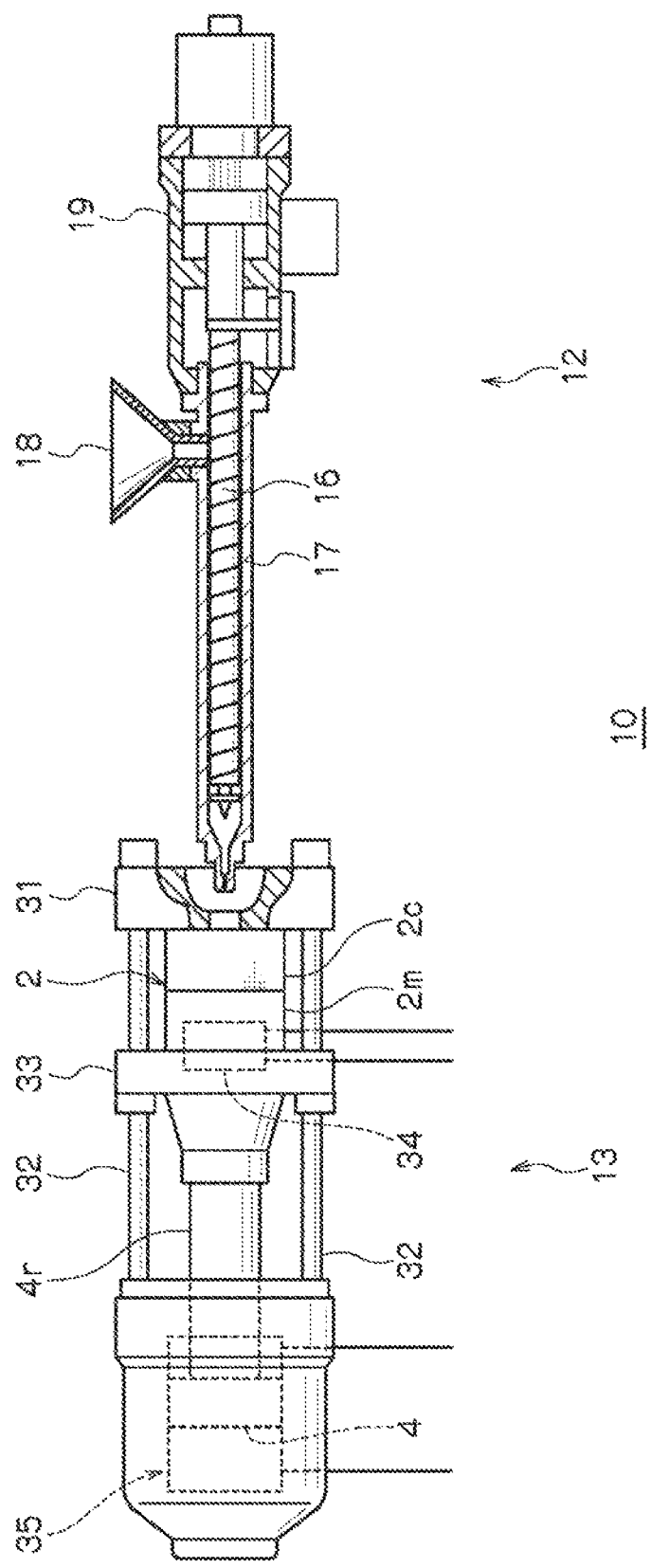
FIG. 6 is an example of a structural view of the injection molding machine.

The mold clamping device 13 is a device that performs mold clamping and mold opening/closing, includes the mold 2 composed of the fixed mold 2c and the movable mold 2m as illustrated in FIG. 1 and FIG. 6, and can clamp the mold 2 by the molding mold clamping force Pc. The mold 2 clamped by the molding mold clamping force Pc is filled with the resin R containing a foaming agent (also referred to as the resin R) at the molding injection pressure Pi by the injection device 12. The resin R is filled by injection from a tip end nozzle of a heating cylinder 17 provided to the injection device 12. In this mold clamping device 13, after the filled resin R is foamed, the mold 2 is opened and the foam-molded product is taken out by an ejection cylinder 34 and the like.

(Injection Device)

As illustrated in FIG. 1 and FIG. 6, the injection device 12 is a device that fills the mold 2 clamped by the molding mold clamping force Pc with the resin R containing a foaming agent at the molding injection pressure Pi. The injection device 12 is mainly configured by the heating cylinder 17 that plasticizes the resin R, a hopper 18 that stores the resin R supplied to the heating cylinder 17, and an injection cylinder 19. The screw 16 is provided to the interior of the heating cylinder 17. The resin R supplied from the hopper 18 to the interior of the heating cylinder 17 is heated by a heater (not illustrated) wrapped around the outer periphery, measured while being plasticized, fed to the tip end side by a rotation operation of the screw 16, and injected from the tip end nozzle to advance the screw 16. In the injection cylinder 19, a hydraulic drive device or an electric drive device is used as a drive power source. Although the mechanical measurement of the resin by this injection device 12 is performed with the same accuracy as in the related art, in the present invention, the filling amount is controlled by the molding injection pressure Pi for performing a just-packing control inside the mold 2 with the resin R containing a foaming agent. As a result, stable resin filling can be realized compared to the conventional mechanical measurement.

(Control Device)

The control device 51 is a device that controls the operation of the mold clamping device 13 and the injection device 12. This control device 51 performs resin filling control of filling the mold 2, clamped by the molding mold clamping force Pc, with the resin R at the molding injection pressure Pi, filling stopping control of stopping the filling when, while monitoring the mold gap Lm of the mold 2 during the filling, a predetermined mold gap value set in advance is reached, surface layer curing and filled resin cooling control of curing the surface layer of the resin R for a certain time and cooling the filled resin R for a certain time after the filling is stopped, volume control of controlling the volume increase by reducing the molding mold clamping force Pc to the mold clamping force Pc′ after curing the surface layer of the resin R for a certain time, and taking out control of taking out the foam-molded product by opening the mold 2 after the volume control is performed and after cooling the filled resin R for a certain time.

(Foam Molding Method)

The foam molding method according to the present invention is a method performed by controlling the operation of the mold clamping device 13 and the injection device 12 described above, and includes a resin filling step of performing the resin filling control, a filling stopping step of performing the filling stopping control, a surface layer curing and filled resin cooling step of performing the surface layer curing and filled resin cooling control, a volume controlling step of performing the volume control, and a foam-molded product taking out step of performing the taking out control of the foam-molded product described above. Each of these steps will be described below in order together with explanations of each of the controls of the above-described injection molding machine 10 as well.

First, each step of the foam molding method at the time of production will be described with reference to FIG. 4, and subsequently each step when setting the conditions in advance will be described with reference to FIG. 5. It should be noted that FIGS. 2A to 2D are explanatory views of the mold gap of the mold in each step, FIG. 2A being the mold gap before the starting of injection, FIG. 2B being the mold gap after the mold is filled with the resin at the predetermined molding injection pressure Pi, FIG. 2C being the mold gap after the surface layer of the resin is cured for a certain time, and FIG. 2D being the mold gap when the volume increase is controlled by reducing the molding mold clamping force Pc to the mold clamping force Pc′. Further, FIG. 3 is a graph showing a relationship between time and the mold gap of the mold measured in each step, where symbol A is the resin filling time from before injection filling to a just-packing time, symbol B is the surface layer curing time from the just-packing time to a surface layer curing stop time, symbol C is the cooling time from the just-packing time to a cooling stop time, and symbol D is a core-back time for opening the mold gap and causing foaming from a surface curing stop point to the stopping of core back.

(Resin Filling Step)

The resin filling step is a step of filling the mold 2 clamped by the molding mold clamping force Pc with the resin R containing a foaming agent at the molding injection pressure Pi. This resin filling step is represented by steps 21 to 23 in FIG. 4. The conditions of the molding mold clamping force Pc and the molding injection pressure Pi are set in advance in the condition establishing flow illustrated in FIG. 5.

First, the resin R containing a foaming agent (hereinafter referred to as the "resin R") is plasticized (step 21). The resin R is plasticized by heating the heating cylinder 17 constituting the injection device 12 and rotating the screw 16. It should be noted that the resin R and the foaming agent to be contained are selected as desired in accordance with the intended foam-molded product, and various conditions described later are optimized in accordance with the material. Simultaneously with or before or after this step 21, the mold 2 to be filled with the plasticized resin R is clamped by the molding mold clamping force Pc (step 22). The mold clamping by the molding mold clamping force Pc is performed by a mold clamping mechanism provided to the mold clamping device 13.

Figure 2A:
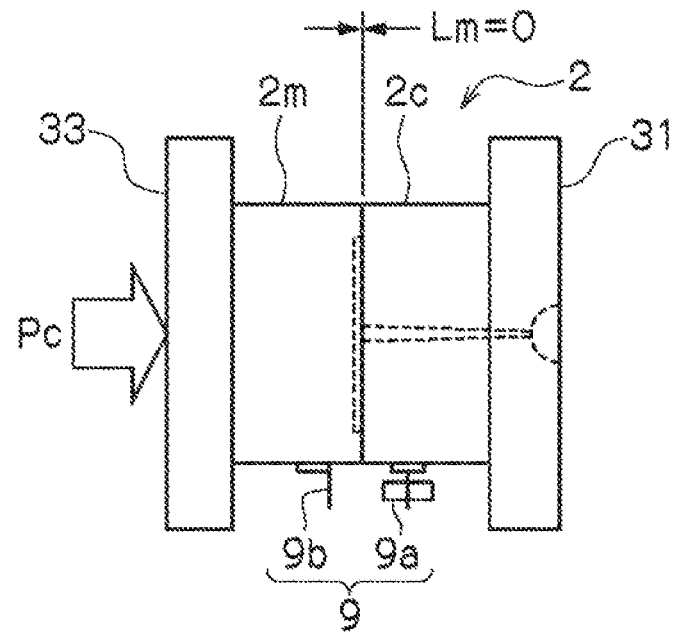
FIGS. 2A to 2D are explanatory views of a mold gap of a mold in each step, FIG. 2A being the mold gap before injection filling, FIG. 2B being the mold gap when the mold is filled (during just-packing) with a resin at a predetermined molding injection pressure Pi, FIG. 2C being the mold gap when a surface layer of the resin is cured for a certain time (surface curing point), and FIG. 2D being the mold gap when a volume increase is controlled (during core-back operation) by reducing a molding mold clamping force Pc to a mold clamping force Pc'.
Figure 3:
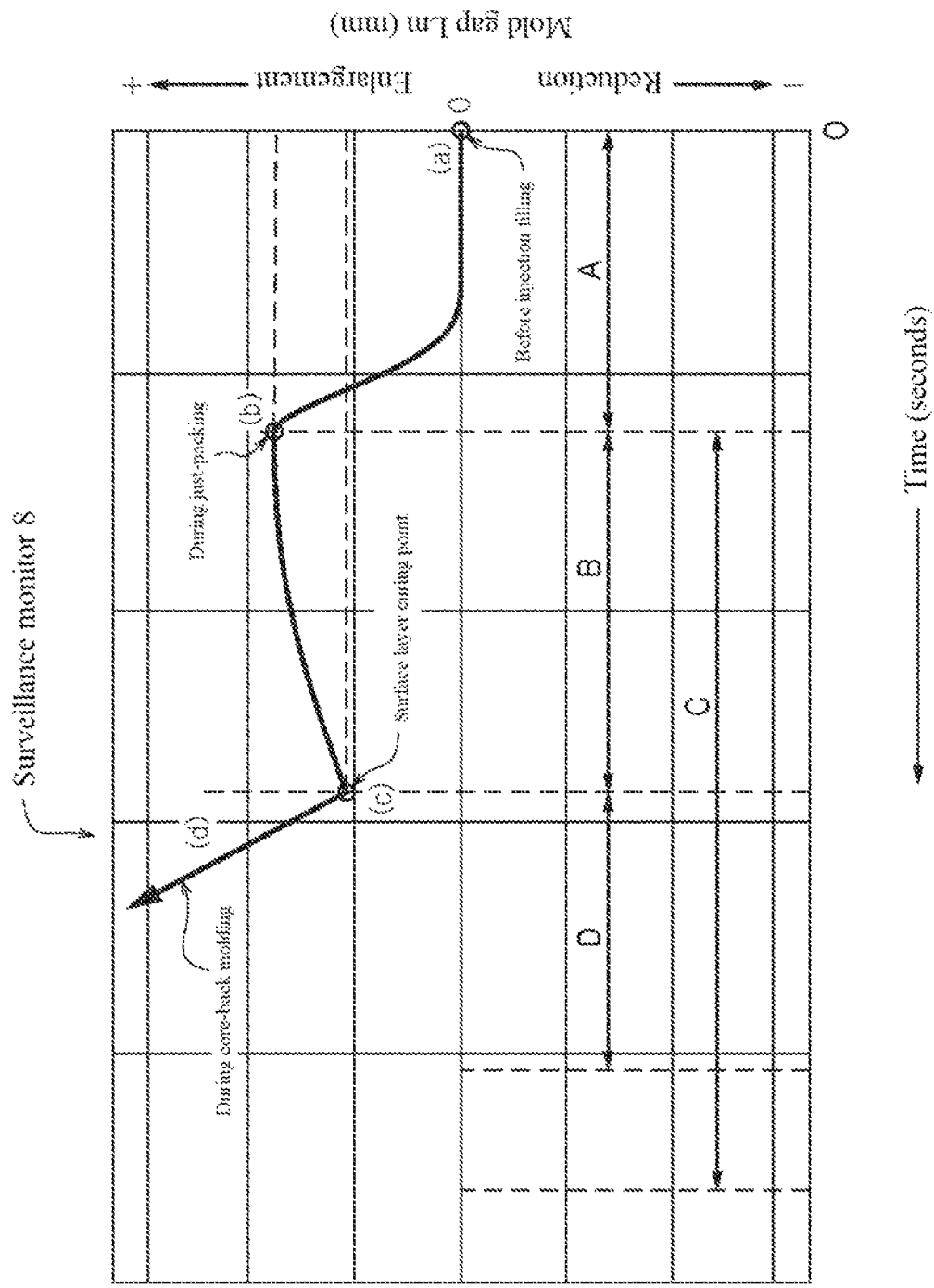
FIG. 3 is a graph showing a relationship between time and the mold gap of the mold measured in each step.

Before the injection filling step illustrated in FIG. 2A, mold splitting surfaces (P/L surfaces) of a mold parting line (P/L) between the movable mold 2*m* and the fixed mold 2*c* are brought into contact so that there is no gap (Lm=0) as illustrated in FIG. 2A.

It should be noted that, as the mold clamping device 13, for example, as illustrated in FIG. 6, a direct-pressure type hydraulic mold clamping device that displaces the movable mold 2*m* by a driving piston 4 of a mold clamping cylinder (hydraulic cylinder) 35 is preferably used. By using the hydraulic mold clamping device, it is possible to displace the movable mold 2*m* and generate the necessary mold gap Lm by the molding injection pressure Pi. As illustrated in FIG. 6, the mold clamping device 13 includes a fixed board 31 and the mold clamping cylinder 35 disposed apart from each other, and a movable board 33 slidably loaded to a plurality of tie bars 32 installed between the fixed board 31 and the mold clamping cylinder 35. The movable board 33 fixes the tip end of a piston rod 4*r* protruding forward from the driving piston 4 of the mold clamping cylinder 35. The fixed mold 2*c* is attached to the fixed board 31, and the movable mold 2*m* is attached to the movable board 33. The mold 2 composed of the fixed mold 2*c* and the movable mold 2*m* is opened/closed and clamped by the mold clamping cylinder 35. Reference numeral 34 denotes an ejection cylinder that ejects (takes out) the molded product adhered to the movable mold 2*m* when the mold 2 is opened. It should be noted that the description of a hydraulic circuit for controlling the mold clamping cylinder 35, the injection cylinder 19, and the like is the same as that of known techniques, and thus is omitted here.

Figure 2B:
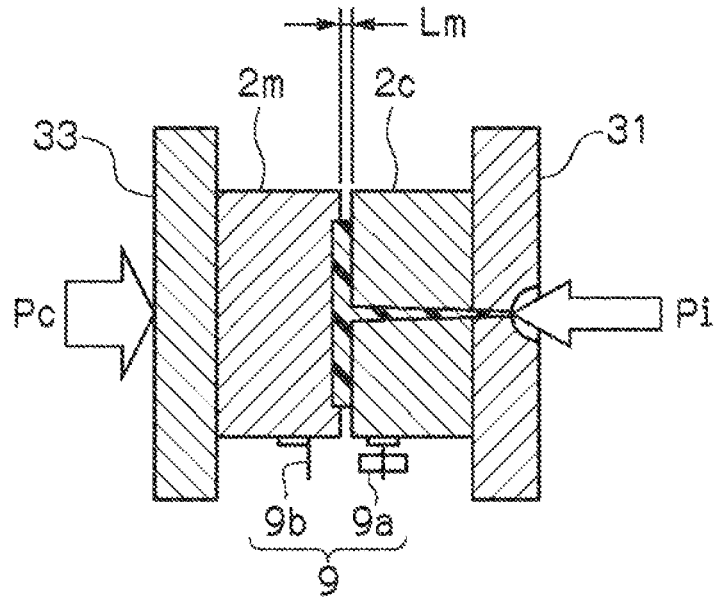
Figure 2C:
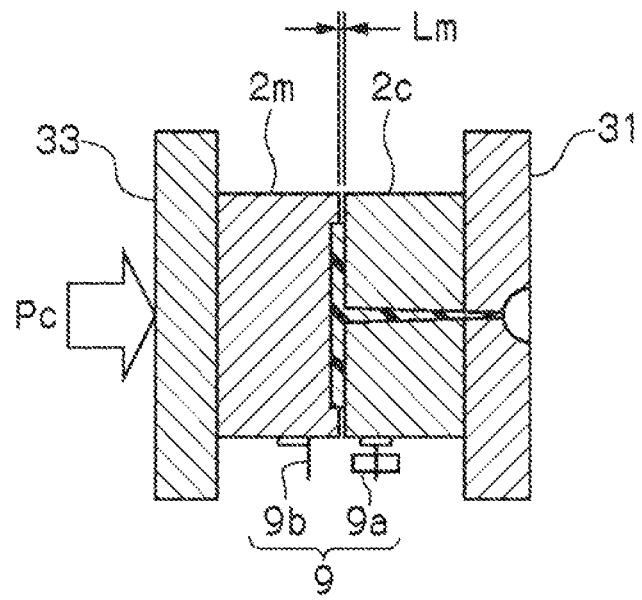

Next, the plasticized resin R is injected and filled into the clamped mold 2 at the molding injection pressure Pi (step 23). The injection at the molding injection pressure Pi is performed on the basis of set data set in advance in the condition establishing flow illustrated in FIG. 5, and is performed while detecting the pressure using the pressure sensor provided to the injection device 12. When the resin R is injected and filled, the pressure inside the mold rises, and the mold gap Lm of the mold 2 clamped by the molding mold clamping force Pc enlarges against the molding mold clamping force Pc as shown in FIG. 2B and FIG. 3 (step 24). The enlargement of this mold gap Lm, as shown in FIG. 3, is graphed with the surveillance monitor and the state can be identified.

The graph of FIG. 3 shows an example of the relationship between the mold gap Lm of the mold 2 and the elapsed time. In the example in FIG. 3, the injection starts at the point where the elapsed time is 0 seconds, and the mold gap Lm starts to enlarge against the molding mold clamping force Pc at approximately 0.8 seconds. In the example in FIG. 3, the predetermined mold gap Lm, corresponding to the molding injection pressure Pi, is reached at the time of approximately 1.2 seconds. The time from starting the resin filling to reaching the predetermined mold gap Lm is a "resin filling time A." Such a molding mold clamping force Pc and molding injection pressure Pi are set in advance on the basis of a type of the resin R, a size of the molded product, a size of the mold 2 corresponding thereto, an injection amount, an injection pressure, a molding time, a wall thickness of the product, and the like by the condition setting step illustrated in FIG. 5. As exemplified in FIG. 3, in a case where mold clamping is performed by the same molding mold clamping force Pc, the predetermined mold gap Lm corresponding to the molding injection pressure Pi becomes somewhat larger by filling at an increased injection pressure, and becomes somewhat smaller by filling at a decreased injection pressure. The conditions of such a molding mold clamping force Pc and molding injection pressure Pi are respectively set by optimizing the injection pressure against the mold clamping force corresponding to the predetermined mold gap Lm on the assumption that a favorable resin-filled state will be achieved. As a result, it is possible to control the filling amount of the resin R by the injection pressure, and stably realize a favorable resin-filled state. Further, it is not necessary to manage the injection filling amount by a stroke of the screw 16, making it possible to make the resin amount filled in the mold 2 constant without being influenced by injection position control or the operation of the backflow preventing valve.

The mold gap Lm can be monitored by the mold gap sensor 9. Unlike the conventional mold internal pressure sensor, the mold gap sensor 9, as illustrated in FIGS. 2A to 2D, can be attached not inside the cavity such as in the related art, but to a desired position on the mold outer surface not affected by the generated gas. As a result, the problem of corrosion such as in the related art can be prevented. Furthermore, in a case where the shape and the size of the molded product differ, distortion and deviation may occur in the molding mold. However, even in that case, it is possible to provide the mold gap sensor 9 to the mold outer surface not affected by the molded product ultimately obtained, and thus perform accurate measurement by the mold gap sensor 9 even when distortion and deviation occur.

The mold gap sensor 9 is not particularly limited, but a commonly used high-accurate distance measuring sensor or the like can be adopted. Specifically, as illustrated in FIGS. 2A to 2D, the mold gap Lm can be measured by attaching a sensor element 9*a* composed of a distance measuring sensor, and a plate 9*b* to the outer surface of the mold 2, and measuring from the sensor element 9*a* to the plate 9*b*. It should be noted that the measurement data of the mold gap Lm is displayed as a graph with the surveillance monitor 8 having the form shown in FIG. 3. At the moment that the set mold gap value is reached on the basis of the displayed graph or measurement data, for example, subsequent control can be performed. For example, the stopping of the filling, the starting of surface layer curing, the starting of cooling, the control of mold opening (the starting and stopping of core back), and the like described later can be performed. Further, for example, the timing of the starting of the subsequent control may be controlled by the extent to which the set mold gap value is approached. Such control is not particularly limited as long as it is performed on the basis of the displayed graph or measurement data.

(Filling Stopping Step)

The filling stopping step is a step of stopping the filling when, while monitoring the mold gap Lm of the mold 2 during the filling, the predetermined mold gap value set in advance is reached. The resin filling time A in FIG. 3 is the time from starting the resin filling to reaching the predetermined mold gap Lm. This filling stopping step is represented by step 24 in FIG. 4. The starting of the subsequent control when the predetermined mold gap value is reached or approached is as described in the preceding paragraph.

Step 24 is a step of stopping the resin filling when, upon increasing the pressure inside the mold by the injection filling of the resin R in step 23, the mold gap Lm of the mold 2 clamped by the molding mold clamping force Pc reaches the predetermined mold gap value against the molding mold clamping force Pc. The resin filling stops at the moment that the predetermined mold gap value is reached. It should be noted that a specific filling stop operation can be performed by a closing operation of a valve pin provided to the injection device 12, or the like. By displaying the timing at which the resin filling stops on the surveillance monitor 8 for monitoring the measured mold gap data, and using the surveillance monitor 8 as a monitoring position setting device, it is also possible to set the stop timing as desired and execute the stopping.

According to this step, the filling of the resin into the mold 2 clamped by the molding mold clamping force Pc stops when the mold gap Lm of the mold 2 reaches the predetermined mold gap value, making it possible to adopt, as the sensor used for the stop operation, the gap sensor 9 provided outside the cavity instead of a mold internal pressure sensor provided inside the cavity such as in the related art. As a result, corrosion by the generated gas during resin filling does not occur.

(Surface Layer Curing and Filled Resin Cooling Step)

The surface layer curing and filled resin cooling step is a step of curing the surface layer of the resin R for a certain time and cooling the filled resin for a certain time simultaneously or continuously with the stopping of the filling in step 24. The surface layer curing step and the filled resin cooling step start simultaneously or continuously with the stopping of the filling, and thus are represented by the same step 24 as the filling stopping step.

In step 24, as shown in the graph of the relationship between the mold gap data and the elapsed time in FIG. 3, is a step of setting the starting point of calculation for starting the surface layer curing time B and the resin cooling time C to the moment that the resin filling stops and the mold gap reaches the predetermined mold gap value. This starting point of calculation of the surface layer curing coincides with the time when the filling stops. That is, the surface layer curing starts at the moment that the resin filling stops. The time of starting the surface layer curing (surface layer curing time B) is the moment that the resin filling stops. It should be noted that it is also possible to perform control by monitoring the mold gap value instead of a timer count. In this way, the starting point of calculation for starting the surface layer curing can be controlled, and the volume control starts when the surface layer curing time (or mold gap value) set in advance is reached. As a result, it is possible to obtain a foam-molded product in which the surface layer is appropriately cured.

The "certain time (surface layer curing time B)" is set in advance on the basis of the type of the resin R, the size and the shape of the molded product, the size and the shape of the mold 2 corresponding thereto, the resin amount, the wall thickness of the product, and the like by the condition setting step described later in FIG. 5. In the example in FIG. 3, the surface layer curing starts at the same time as the filling stops at approximately 1.2 seconds, which is the moment that the predetermined mold gap value is reached, and the time of the approximately 1.6 seconds up to the approximately 2.8 seconds is set as the surface layer curing time B serving as the predetermined "certain time." It should be noted that, in this surface layer curing step, the resin cooling is also performed at the same time, and thus the gap Lm becomes gradually smaller due to natural shrinkage of the resin, as illustrated in the FIG. 2C and the graph of FIG. 3. When the filling of the heated resin stops, the resin cooling starts, and a temperature of the surface layer of the filled resin decreases for the first time to cure the surface layer. With the surface layer curing for a certain time (surface layer curing time B), the surface of the molded product becomes a dense, thin, flat resin layer, and a foam-molded product with a fine appearance can be obtained. Although the length of the certain time is controlled by time, the length may be controlled by the mold gap Lm that naturally shrinks. In a case of control by time, the length can be set by a timer count and, in a case of control by the mold gap Lm, the length can be set by data measured with the mold gap sensor 9. With the condition of the length of a certain time or the mold gap Lm set in advance, it is possible to increase or decrease the thickness of the dense surface layer, and manufacture a foam-molded product corresponding to demands.

It should be noted that the step of starting the cooling of the filled resin R is also step 24. On the other hand, the step 27 of stopping the cooling is a step that continues until after the volume controlling step (core-back step) of the steps 25 and 26 below, and is a step of cooling the filled resin R until a foam-molded product is obtained. The starting point of calculation for starting the cooling is the same as the starting point of calculation for starting the surface layer curing.

(Volume Controlling Step)

Figure 2D:
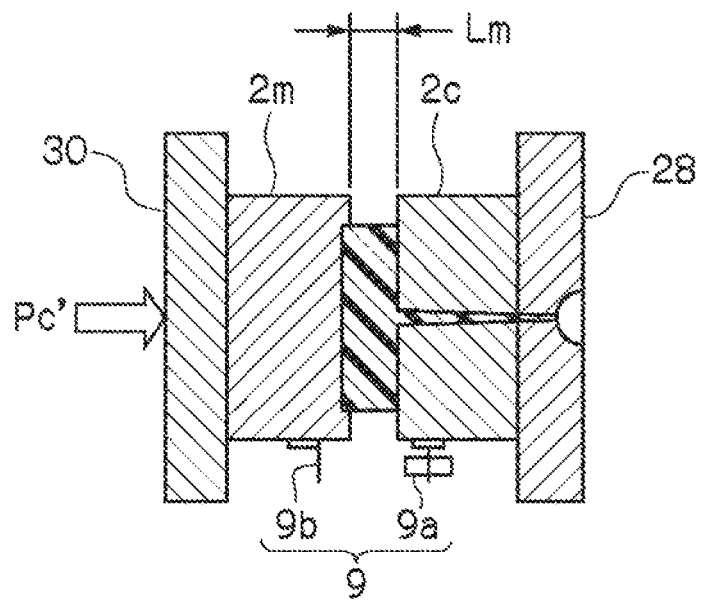

The volume controlling step is a step of controlling the volume increase by reducing the molding mold clamping force Pc to the mold clamping force Pc' after curing the surface layer of the resin R for a certain time (surface layer curing time B). In FIG. 4, this volume controlling step is configured by the starting of core back (step 25) performed simultaneously or continuously with the stopping of the surface layer curing, and the stopping of core back (step 26). As illustrated in FIG. 2D, volume increase is controlled by reducing the molding mold clamping force Pc to the mold clamping force Pc' to enlarge the mold gap Lm to a predetermined value. The enlargement of the mold gap Lm by reducing the mold clamping force can be performed by monitoring the mold gap data of the mold gap sensor 9. The enlargement speed of the mold gap Lm (also referred to as the mold gap enlargement speed) can be performed by controlling a reduction speed of the mold clamping force, or the like.

The volume increase is controlled by one or two or more forces selected from the predetermined mold clamping force applied to the mold 2, a mold opening force by an internal pressure based on foaming of the resin R, a mold opening force by a spring provided to the mold 2, and a mechanical mold opening force by the mold clamping cylinder 35. With this control, the molding mold clamping force Pc reduces to the mold clamping force Pc' to enlarge the mold gap Lm to a predetermined value. The enlargement of the mold gap Lm can be controlled while monitoring the mold gap Lm reaching a predetermined mold gap value. The mold opening force by the internal pressure based on the foaming of the resin R, the mold opening force by the spring provided to the mold 2, and the mechanical mold opening force by the mold clamping cylinder 35 are each a counter force against a predetermined mold clamping force applied to the mold 2. These forces are balanced to enlarge the mold gap Lm to a predetermined value. While an internal pressure based on the foaming of the resin R always exists, the mold opening force due to the internal pressure alone cannot withstand the predetermined mold clamping force applied to the mold 2. Accordingly, control is performed by utilizing one or both of the mold opening force by the spring provided to the mold 2 and the mechanical mold opening force by the mold clamping cylinder 35.

The size of the mold gap Lm affects the degree of foaming and the strength of the foam-molded product, and thus the degree of enlargement of the mold gap Lm is set in consideration thereof. The set value is set by condition setting in advance described later.

(Foam-Molded Product Taking Out Step)

The foam-molded product taking out step is a step of taking out the foam-molded product by opening the mold 2 after the volume control (steps 25 and 26) is performed and the cooling time C of the filled resin has elapsed (step 27). This taking out step is represented by step 28 in FIG. 4. The foam-molded product took out in this taking out step is a foam-molded product in a homogeneous foamed state. It should be noted that, when the foam-molded product is taken out from the mold, is performed by the opening of the mold and the operation of the ejection cylinder 34. Such a mechanism, however, is the same as that of the conventional techniques, and thus an explanation thereof is omitted here.

After the foam-molded product taking out step, manufacture is continued or ended by step 29 of selecting whether manufacture is to be continued or ended. The selection in this step 29 may be performed by setting in advance before manufacture or may be performed each time. The setting performed in advance may be corresponded to the resin amount added or may be corresponded to the manufacture quantity.

(Other)

In the present invention, it is desirable to monitor the mold gap Lm with the surveillance monitor 8. The surveillance monitor 8 includes a display panel that displays or displays and sets one or two or more data selected from the mold clamping force, the injection pressure, the mold gap, the mold gap value, a curing time of the surface layer, a cooling time of the filled resin, and the mold clamping force or the mold gap value or the mold gap enlargement speed for volume increase. With such a surveillance monitor 8, it is easier to display the data or to display and set the data on the display panel, and a workability and a manageability of the monitoring can be improved. For example, the graph shown in FIG. 3 appears on the surveillance monitor 8 in real time while being drawn as time elapses. As the "display panel," the display device 14 illustrated in FIG. 1, or the like can be exemplified, and a setting device is included. It should be noted that the "mold gap enlargement speed" is the speed at which the mold gap enlarges, and can be calculated from an inclination during the core-back operation in the graph of FIG. 3.

(Condition Setting)

The foam molding method according to the present invention includes a condition setting step of setting in advance one or two or more data selected from the mold clamping force, the injection pressure, the mold gap, the mold gap value, the curing time of the surface layer, the cooling time of the filled resin, and the mold clamping force or the mold gap value or the mold gap enlargement speed for volume increase described above by the condition setting step in advance, and setting a predetermined value during manufacture from the set data. With this condition setting step, a predetermined value during manufacturing is set from data set in advance, and thus by applying the set value as the condition of each step at the time of mass production, it is possible to manufacture a stable foam-molded product.

Figure 5:
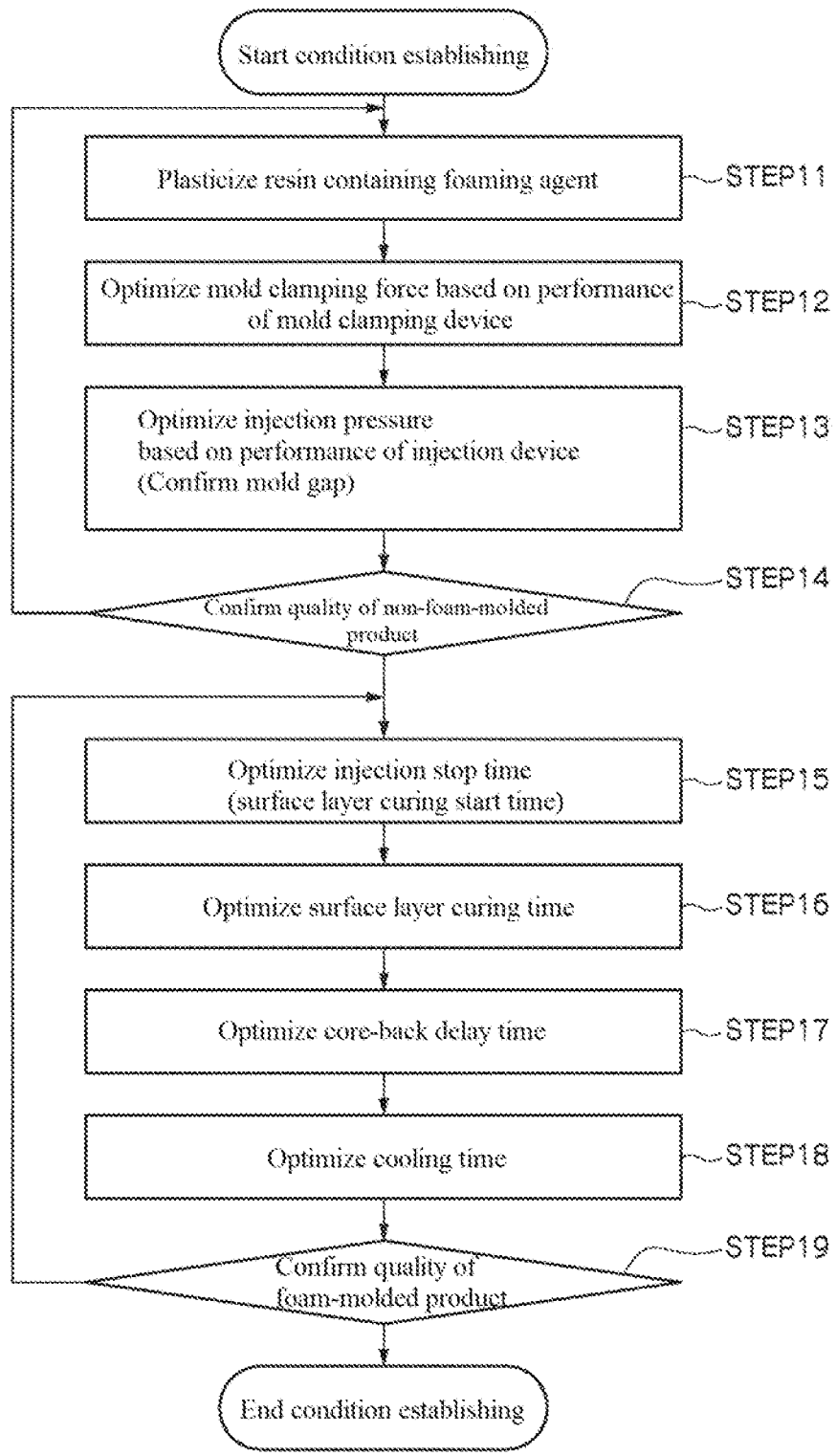
FIG. 5 is an explanatory view of a process flow for setting foam molding conditions in advance.

FIG. 5 is an explanatory view of a process flow for setting foam molding conditions in advance. First, the molding mold clamping force Pc and the molding injection pressure Pi are set to establish the condition of whether the resin-filled state before foaming is appropriate in steps 11 to 14. Subsequently, the resin filling time A, the surface layer curing time B, the cooling time C, the volume control time D, the extension length of the mold gap Lm, and the like are set in steps 15 to 18.

First, step 11 is a step of plasticizing the resin R containing a foaming agent. Step 12 is a step of optimizing the mold clamping force set on the basis of the performance of the mold clamping device 13, and step 13 is a step of optimizing the injection pressure set on the basis of the performance of the injection device 12. The mold clamping force is optimized in accordance with the injection pressure, and the injection pressure is also optimized in accordance with the mold clamping force, and thus each optimization is set in consideration of whether or not the predetermined mold gap Lm appears in the P/L surface (step 13) and whether or not the mold is uniformly and homogeneously filled (just-packed) with the resin (step 14). That is, the mold gap Lm is adjusted by the mold clamping force and the injection pressure, and the injection pressure (molding injection pressure Pi) for performing a just-packing control inside the mold 2 and the mold clamping force (molding mold clamping force Pc) at which the opening (predetermined mold gap Lm) of the P/L surface appears when injection molding is performed at the molding injection pressure Pi are set. Step 11 to step 14 are repeated until the molding mold clamping force Pc and the molding injection pressure Pi can be optimized.

Next, step 15 is a step of determining the extent of the mold gap value by which, when reached by the mold gap Lm generated by the molding mold clamping force Pc and the molding injection pressure Pi obtained in step 11 to step 14, the resin filling stops and the surface layer curing and the resin cooling start. Because the mold gap value is determined differently depending on the shape and structure of the mold, the wall thickness of the product, and the like, whether to set a large mold gap Lm or a small mold gap Lm as the mold gap value is determined.

Step 16 is a step of stopping the resin filling when the determined mold gap value is reached, and establishing the condition of the length of the surface layer curing time B after the resin filling is stopped. Step 17 is a step of establishing the condition of the extent of the mold gap Lm by which the mold clamping force is to be reduced to increase the volume after the surface layer curing time B is reached. Step 18 is a step of establishing the condition of the length of the time when cooling is to be performed. Step 19 is a step of taking out the molded foam-molded product and confirming the molded state and the foamed state. Each condition is set by such steps 15 to 19.

Figure 4:
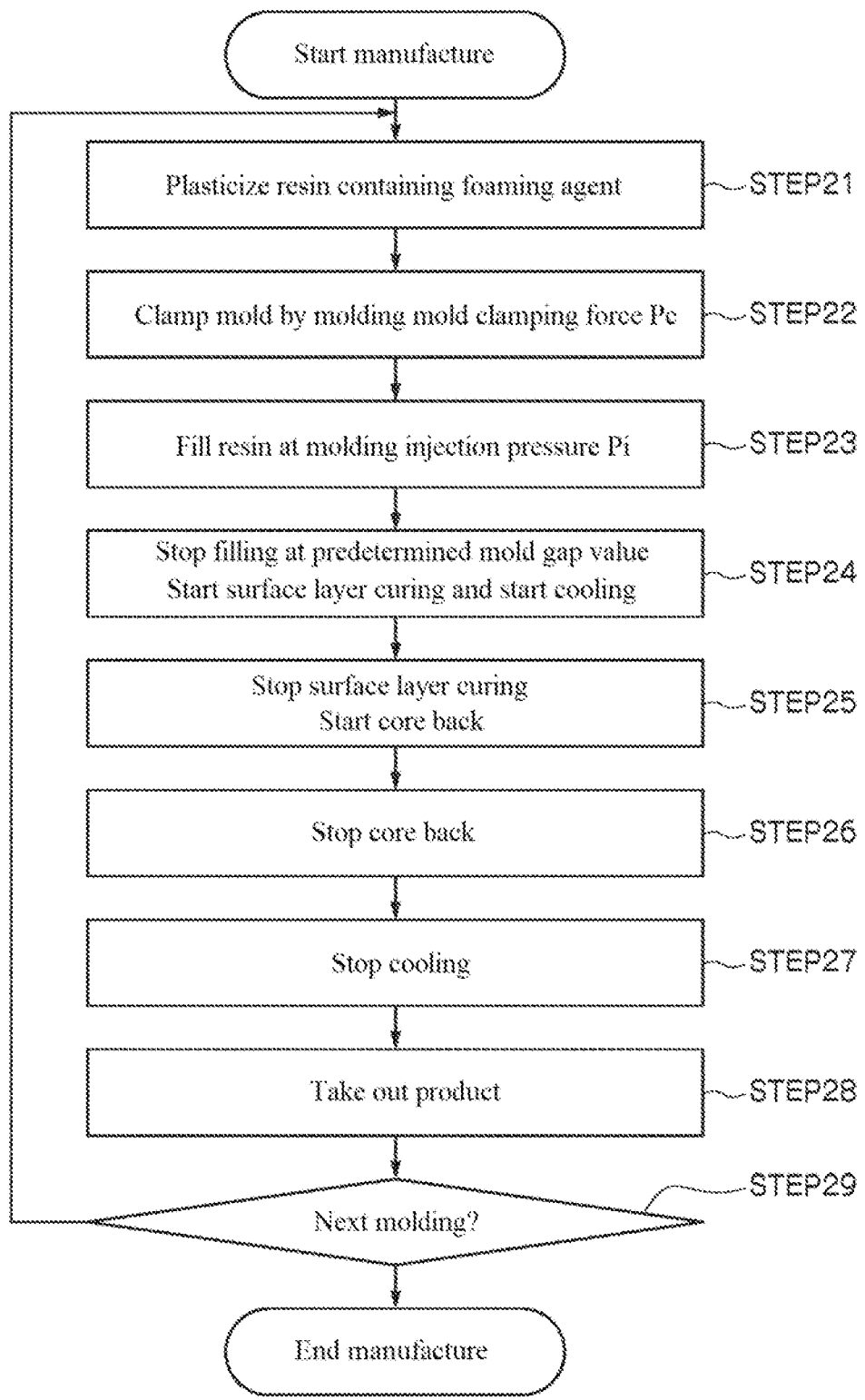
FIG. 4 is an explanatory view of a process flow of a foam molding method.

The set conditions are input as setting conditions in the manufacturing process illustrated in FIG. 4, and thus the foam-molded product can be manufactured.

Thus, the conditions of the molding injection pressure Pi for performing a just-packing control inside the mold 2 and the molding mold clamping force Pc at which the opening (mold gap Lm) of the P/L surface appears when injection molding is performed at the molding injection pressure Pi are set in advance. With mass production carried out under the obtained conditions, it is possible to perform a just-packing control inside the mold 2 with the resin R containing a foaming agent, control the filling amount of the resin R by the injection pressure, and realize stable resin filling. On the other hand, in foam molding, the capacity of the cavity after the mold is filled is expanded to cause foaming, and thus the condition is set in advance that, upon utilizing the molding injection pressure Pi and the molding mold clamping force Pc, core back is performed after the surface layer is cured for a certain time, by using the time at which the predetermined mold gap value is reached as the starting point of the surface layer curing. With such previous settings, it is possible to mass-produce foam-molded products having a quality, homogeneous foamed state.

According to such a present invention, 1) control is performed with a focus on pressure, and thus the variation in the filling amount can be eliminated by monitoring the opening (mold gap Lm) of the P/L surface by the filling pressure. As a result, it is possible to stabilize the dimensions and mass of the product compared to conventional techniques. Further, it is possible to eliminate the variation in an extrusion amount (filling amount) that readily occurs with an in-line screw type molding machine. 2) Furthermore, because the just-pack point can be easily controlled while monitoring the graph with the surveillance monitor 8, the burden on a molding technician is reduced and the yield is increased. 3) The timing of curing the surface of the foamed product is determined by the graph displayed on the surveillance monitor 8. 4) The mold gap sensor 9 is provided on the outer surface of the mold, and thus corrosion due to generated gas does not occur, and failure or replacement of the sensor, or the like based on such corrosion does not occur. This mold gap sensor 9 has the advantage that the sensor can be attached at a desired position at a later point in time, and further there is no concern about temperature drift specific to the sensor as well.

(Example of Control Device)

Figure 7:
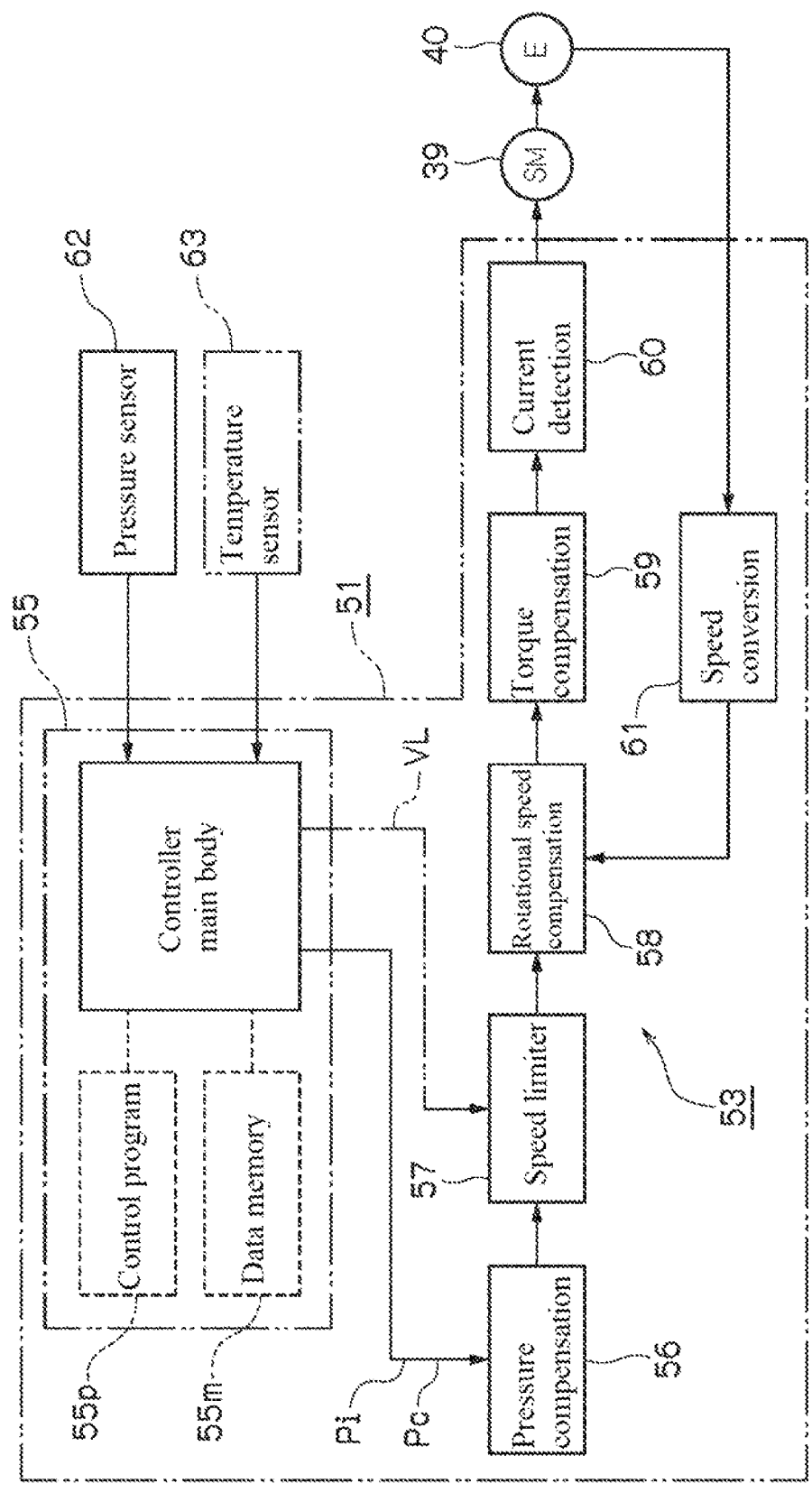
FIG. 7 is an example of a structural view of a control device.

FIG. 7 is a configuration view illustrating an example of the control device 51. The control device 51 is a molding machine controller, and is provided with the display device 14 (refer to FIG. 1). A touch panel is attached to the display device 14, and various setting operations, selection operations, and the like can be performed by a setting device provided to this touch panel. The molding machine controller 51 is not limited to the configuration illustrated in FIG. 7, and may have another configuration.

In FIG. 7, for example, a servo motor 39 is connected to a servo amplifier 53 built into the molding machine controller 51, and a valve circuit (not illustrated) is connected to a control signal output port of the molding machine controller 51. A rotary encoder 40 is connected to an input port of the molding machine controller 51. A pressure sensor 62 for detecting oil pressure and a temperature sensor 63 for detecting oil temperature are connected to a primary side of the valve circuit, and the pressure sensor 62 and the temperature sensor 63 are connected to a control signal output port of the molding machine controller 51.

As illustrated in FIG. 7, the molding machine controller 51 includes a controller main body 55 and the servo amplifier 53. The controller main body 55 has a computer function with built-in hardware such as a central processing unit (CPU) and an internal memory. The internal memory stores a control program 55p for executing various arithmetic processes and various control processes, and includes a data memory 55m that stores various data. The control program 55p includes a control program for realizing at least a portion of the molding method. The servo amplifier 53 includes a pressure compensating part 56, a speed limiter 57, a rotational speed compensating part 58, a torque compensating part 59, a current detecting part 60, a speed converting part 61, and the like. The molding injection pressure Pi or the molding mold clamping force Pc is applied from the controller main body 55 to the pressure compensating part 56, and a speed limit value VL is applied to the speed limiter 57. In this way, a pressure-compensated speed command value is output from the pressure compensating part 56, and applied to the speed limiter 57. The speed command value output from a speed limiter 57 is applied to the rotational speed compensating part 58, and a torque command value output from this rotational speed compensating part 58 is applied to the torque compensating part 59. A motor driving current output from the torque compensating part 59 is supplied to the servo motor 39 to drive the servo motor 39. It should be noted that an encoder pulse obtained from the rotary encoder 40 is converted into a speed detection value by the speed converting part 61 and applied to the rotational speed compensating part 58, thereby performing feedback control of a minor loop with respect to the rotational speed.

The present invention is not limited to the above-described embodiments, and the detailed configurations, shapes, quantities, techniques, and the like can be changed, added, or deleted as desired without deviating from the gist of the present invention. Further, changes can be made in accordance with a new type of resin R, and the like.

DESCRIPTIONS OF REFERENCE NUMERALS

2 Mold
2c Fixed mold
2m Movable mold
3 Mold clamping cylinder
4 Driving piston
4r Piston rod
8 Surveillance monitor
9 Gap sensor
9a Sensor element
9b Plate
10 Injection molding machine
11 Machine base
12 Injection device
13 Mold clamping device
14 Display device
16 Screw
17 Heating cylinder
18 Hopper
19 Injection cylinder
20 Cover
29 Safety door
30 Cover
31 Fixed board
32 Tie bar
33 Movable board
34 Ejection cylinder
35 Mold clamping cylinder
39 Servo motor
40 Rotary encoder
51 Control device (Molding machine controller)
53 Servo amplifier
62 Pressure sensor
63 Temperature sensor
55 Controller main body
55p Control program
55m Data memory
56 Pressure compensating part
57 Speed limiter
58 Rotational speed compensating part
59 Torque compensating part
60 Current detecting part
61 Speed converting part
R Resin
Lm Predetermined gap (Mold gap)
Pi Molding injection pressure (Predetermined injection pressure for performing just-packing control inside mold)

Pc Molding mold clamping force (Mold clamping force at which opening of mold P/L appears when injection molding is performed at molding injection pressure)

VL Speed limit value

What is claimed is:

1. An injection molding machine comprising:

a mold clamping device provided with a mold composed of a fixed mold and a movable mold clamped by a predetermined mold clamping force;

an injection device that fills the mold provided to the mold clamping device with a resin containing a foaming agent at a predetermined injection pressure; and a control device that controls an operation of the mold clamping device and the injection device, the control device performing resin filling control of filling the mold clamped by the predetermined mold clamping force with the resin at the predetermined injection pressure by the injection device, filling stopping control of stopping the filling when, while monitoring a mold gap of the mold during the filling, a predetermined mold gap value set in advance is reached, surface layer curing and filled resin cooling control of curing a surface layer of the resin for a certain time and cooling the filled resin for a certain time after the filling is stopped, volume control of reducing the mold clamping force to control a volume increase after curing the surface layer of the resin for a certain time, and taking out control of taking out a foam-molded product by opening the mold after the volume control is performed and after cooling the filled resin for a certain time.

2. The injection molding machine according to claim 1, further comprising:

a display panel that displays or displays and sets one or two or more data selected from the mold clamping force, the injection pressure, the mold gap, the mold gap value, a curing time of the surface layer, a cooling time of the filled resin, and the mold clamping force or the mold gap value or a mold gap enlargement speed for the volume increase.

3. The injection molding machine according to claim 1, wherein the control device sets a starting point of calculation for starting a surface layer curing time and a resin cooling time in the surface layer curing and filled resin cooling control to, when data of the mold gap and elapsed time are graphed, the moment that the mold gap reaches a predetermined mold gap value.

4. The injection molding machine according to claim 1, wherein the control device controls the volume increase in the volume control by using one or two or more forces selected from the predetermined mold clamping force applied to the mold, a mold opening force by an internal pressure based on foaming of the resin, a mold opening force by a spring provided to the mold, and a mechanical mold opening force by a mold clamping cylinder, and reducing the mold clamping force to enlarge the mold gap to a predetermined value.

* * * * *